(12) United States Patent
Chen

(10) Patent No.: US 6,751,675 B1
(45) Date of Patent: Jun. 15, 2004

(54) MOVING SET PACKET PROCESSOR SUITABLE FOR RESOURCE-CONSTRAINED DEVICES

(75) Inventor: Joe J. Chen, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/441,224

(22) Filed: Nov. 15, 1999

(51) Int. Cl.$^7$ .............................. G06F 15/16; G06K 5/00
(52) U.S. Cl. ......................... 709/250; 902/26; 235/380
(58) Field of Search ................................. 709/236, 250; 718/1; 711/6; 710/30; 713/172–174, 185; 705/17, 41, 65–69; 235/379–382, 382.5; 902/4.5, 26; 716/17; 455/556.1, 556.2; 340/7.52; 370/474, 912

(56) References Cited

U.S. PATENT DOCUMENTS

| | | |
|---|---|---|
| 5,185,694 A | 2/1993 | Edenfield et al. |
| 6,195,700 B1 * | 2/2001 | Bender et al. .............. 709/230 |
| 6,339,820 B1 * | 1/2002 | Baentsch et al. ........... 712/209 |

OTHER PUBLICATIONS

Multi–Threded Buffer Management Method for Lexical Analyzers, IBM Tech. Disclosure Bulletin, vol. 37, No. 10, pp. 509–512, p 1–5 (as printed), Oct. 1994.*
Computer Dictionary, 3rd ed., Microsoft Press, pp. 26 and 112, 1997.*
Chen, Zhiqun, "Java Card™ Technology for Smart Cards", *Sun Microsystems*, pp. 11–16, Jun., 2000, pp. 11–16.
Sun Microsystems, Inc., "Java Card™ 2.0 Language Subset and Virtual Machine Specification", Oct. 13, 1997, Revision 1.0 Final, pp. 1–14.
Sun Microsystems, Inc., "Java Card™ 2.0 Programming Concepts", Oct. 15, 1997, Revision 1.0 Final, pp. 1–25.
"Sun Delivers On Vision to Bring JAVA Technology to the Consumer and Enbedded Market", Business Wire, Sep. 28, 1999, pp. 1–2.
"Sun Microsystems Announces JAVACARD API", Business Wire, Oct. 1996, pp. 1–3.

(List continued on next page.)

*Primary Examiner*—Andrew Caldwell
(74) *Attorney, Agent, or Firm*—Thelen Reid & Priest, LLP; John P. Schaub

(57) ABSTRACT

A method for data communication includes receiving a data packet that includes at least one contiguous data item, defining a window that initially includes the beginning of the data items, determining whether the window includes a part of a split data item and processing the contiguous data items when there are no split data items. The method also includes processing all data items occurring before a split data item when a split data item is found, storing the first part of a split data item, moving the window to include both parts of the split data item, appending the stored first part to the second part to create an appended packet and processing the appended packet. An apparatus for data communication includes at least one memory having program instructions and at least one processor configured to use the program instructions to receive a data packet that includes at least one contiguous data item, define a window that initially includes the beginning of the data items, determine whether the window includes a part of a split data item and process the contiguous data items when there are no split data items. The processor is also configured to process all data items occurring before a split data item when a split data item is found, store the first part of a split data item, move the window to include both parts of the split data item, append the stored first part to the second part and process the result.

18 Claims, 4 Drawing Sheets

OTHER PUBLICATIONS

Sun Microsystems: "Sun's JAVA Technology Leads Open Worldwide Market for Smart Cards", M2, Presswire, May 1999, pp. 1–5.

Sun Microsystems, Inc., "Java Card™ Applet Developer's Guide", Aug. 19, 1998, Revision 1.12, all pages.

Sun Microsystems, Inc., Java Card™ 2.0 Application Programming Interfaces, Oct. 13, 1997, Revision 1.0 Final, pp. 1–163.

Sun Microsystems, Inc., "Java Card™ 2.1 Application Programming Interface", Jun. 7, 1999, Final Revision 1.1, pp. 1–206.

Sun Microsystems, Inc., "Java Card™ 2.1 Runtime Environment (JCRE) Specification", Jun. 7, 1999, Final Revision 1.1, all pages.

Sun Microsystems, Inc., Java Card™ 2.1 Virtual Machine Specification, Jun. 7, 1999, Final Revision 1.1, pp. 1–252.

Sun Microsystems, Inc., "Release Notes—Java Card™ 2.1 Specifications", Jun. 7, 1999, Final Revision 1.1, pp. 1–18.

Sun Microsystems, Inc., "The K Virtual Machine (KVM)", White Paper, Jun. 8, 1999, pp. 1–17.

* cited by examiner

MOVING SET PACKET PROCESSOR SUITABLE FOR RESOURCE-CONSTRAINED DEVICES

CROSS REFERENCE TO RELATED APPLICATIONS

U.S. patent application Ser. No. 09/243,101, filed Feb. 2, 1999, Susser and Schwabe, entitled OBJECT-ORIENTED INSTRUCTION SET FOR RESOURCE CONSTRAINED DEVICES.

U.S. patent application Ser. No. 08/839,621, filed Apr. 15, 1997, Levy and Schwabe, entitled VIRTUAL MACHINE WITH SECURELY DISTRIBUTED BYTECODE VERIFICATION, now U.S. Pat. No. 6,092,147.

BACKGROUND OF THE INVENTION

1. Field of the Invention

The present invention relates to computer systems. More particularly, the present invention relates to moving set data communications.

2. Background

A virtual machine is an abstract computing machine generated by a software application or sequence of instructions that is executed by a processor. The term "architecture-neutral" refers to programs, such as those written in the Java™ programming language, which can be executed by a virtual machine on a variety of computer platforms having a variety of different computer architectures. Thus, for example, a virtual machine being executed on a Windows™-based personal computer system will use the same set of instructions as a virtual machine being executed on a UNIX™-based computer system. The result of the platform-independent coding of a virtual machine's sequence of instructions is a stream of one or more bytecodes, each of which is, for example, a one-byte-long numerical code.

The Java™ Virtual Machine is one example of a virtual machine. Compiled code to be executed by the Java™ Virtual Machine is represented using a hardware- and operating system-independent binary format, typically stored in a file, known as the class file format. The class file is designed to handle object oriented structures that can represent programs written in the Java™ programming language, but may also support is several other programming languages. The class file format precisely defines the representation of a class or interface, including details such as byte ordering that might be taken for granted in a platform-specific object file format. For the sake of security, the Java™ Virtual Machine imposes strong format and structural constraints on the instructions in a class file. Any language with functionality that can be expressed in terms of a valid class file can be hosted by the Java™ Virtual Machine. The class file is designed to handle object oriented structures that can represent programs written in the Java™ programming language, but may also support several other programming languages. The Java™ Virtual Machine is described in detail in Lindholm, et al., "The Java™ Virtual Machine Specification", April 1999, Addison-Wesley Longman, Inc., Second Edition.

Resource-constrained devices are generally considered to be those that are relatively restricted in memory and/or computing power or speed, as compared to typical desktop computers and the like. By way of example, other resource-constrained devices include cellular telephones, boundary scan devices, field programmable devices, personal digital assistants (PDAs) and pagers and other miniature or small footprint devices.

Smart cards, also known as intelligent portable data-carrying cards, are a type of resource-constrained device. Smart cards are made of plastic or metal and have an electronic chip that includes an embedded microprocessor or microcontroller to execute programs and memory to store programs and data. Such devices, which can be about the size of a credit card, have computer chips with 8-bit or 16-bit architectures. Additionally, these devices typically have limited memory capacity. For example, some smart cards have less than one kilo-byte (1K) of random access memory (RAM) as well as limited read only memory (ROM), and/or non-volatile memory such as electrically erasable programmable read only memory (EEPROM).

A Java™ virtual machine executes virtual machine code written in the Java™ programming language and is designed for use with a 32-bit architecture. It would be desirable to write programs that use the full implementation of the Java™ Virtual Machine for execution on resource-constrained devices such as smart cards. However, due to the limited architecture and memory of resource-constrained devices such as smart cards, the full Java™ Virtual Machine platform cannot be implemented on such devices. Accordingly, a separate Java Card™ (the smart card that supports the Java™ programming language) technology supports a subset of the Java™ programming language for resource-constrained devices.

Turning now to FIG. 1, a typical apparatus for installing applications on a Java Card™ technology enabled device 120 is presented. In Java Card™ technology, a Java Card™ converter 100 takes regular class files 105 as input and converts them to a CAP (converted applet) file 110. The CAP format supports a subset of the class file information. Each CAP file 110 contains all of the classes and interfaces defined in one Java™ package. After conversion, the CAP file 110 is copied to a card terminal, such as a desktop computer with a card reader peripheral. Then an installation tool 115 on the terminal loads the CAP file 110 and transmits it to the Java Card™ technology enabled device 120. An installation application 125 on the Java Card™ technology enabled device 120 receives and processes the data from the terminal to install the application on the Java Card™ technology enabled device 120.

Due to resource-constrained nature of a typical Java Card™ technology enabled device 120, only a relatively small amount of memory is available for data communication. Thus, the communication between the terminal and the Java Card™ technology enabled device 120 typically consists of multiple application data units (APDUs) 135 sent from the terminal to the Java Card™ technology enabled device 120. An APDU 135 is data packet having a data portion that ranges in size from 32 bytes to 256 bytes. Data that is sent from the terminal is encapsulated in one or more APDUs 135 before being sent to the Java Card™ technology enabled device 120.

Since the size of the multiple data values encapsulated varies, the data values are frequently split between multiple APDUs 135. Table 1 illustrates the data portion of an APDU 135. Table 2 shows data to be encapsulated in an APDU 135.

TABLE 1

| 32 bytes APDU Data |
|---|

TABLE 2

| 17 bytes | 8 two-byte integers |
|---|---|

If the data shown in Table 2 were encapsulated in an APDU 135 represented by Table 1 while preserving the relative order of the data, there would be insufficient room for the second sixteen-bit integer, resulting in a "data split" problem. This data split problem is typically handled by processing the data on the terminal side to guarantee the data will not be split. This processing on the terminal side may include by way of example, changing the size of the APDU 135 to prevent a data split, or reordering the data within APDUs before sending them to a Java Card™ technology enabled device 120. Each of these solutions has disadvantages.

Changing the size of the APDU 135 and reordering the data within the APDU 135 requires complex negotiation between the terminal and the card. The terminal must transform the data and provide the card with enough information to reconstruct the data. The card must receive the information from the terminal, reconstruct the data and provide a response to the terminal. Making the terminal and card applications data-dependent as such increases processing overhead. This data dependency also increases memory overhead, both in terms of program size and the amount of RAM required to store buffered data.

Putting intelligence on the terminal side also raises security concerns. Knowing whether a data split problem exists requires that the terminal know the size of each data item being sent. This size information is related to the data type. This information is not available if the data is encrypted. Thus, the terminal must decrypt encrypted data before it interprets the data to determine the size of each data unit. Once the data is decrypted, the terminal has access to private information. In some applications, only the card is meant to interpret the data, not the terminal.

Accordingly, a need exists in the prior art for a method and apparatus for data communications between a terminal device and a smart card that requires relatively little processing and memory overhead on terminal and smart card applications. A further need exists for such a method and apparatus that is relatively secure.

SUMMARY OF THE INVENTION

A method for data communication includes receiving a data packet that includes at least one contiguous data item, defining a window that initially includes the beginning of the data items, determining whether the window includes a part of a split data item and processing the contiguous data items when there are no split data items. The method also includes processing all data items occurring before a split data item when a split data item is found, storing the first part of a split data item, moving the window to include both parts of the split data item, appending the stored first part to the second part to create an appended packet and processing the appended packet. An apparatus for data communication includes at least one memory having program instructions and at least one processor configured to use the program instructions to receive a data packet that includes at least one contiguous data item, define a window that initially includes the beginning of the data items, determine whether the window includes a part of a split data item and process the contiguous data items when there are no split data items. The processor is also configured to process all data items occurring before a split data item when a split data item is found, store the first part of a split data item, move the window to include both parts of the split data item, append the stored first part to the second part and process the result.

DETAILED DESCRIPTION OF SPECIFIC EMBODIMENTS

Those of ordinary skill in the art will realize that the following description of the present invention is illustrative only. Other embodiments of the invention will readily suggest themselves to such skilled persons having the benefit of this disclosure.

This invention relates to computer systems. More particularly, the present invention relates to moving set data communications. The invention further relates to machine readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

Resource-constrained devices are generally considered to be those that are relatively restricted in memory and/or computing power or speed, as compared to typical desktop computers and the like. Although the particular implementation discussed below is described in reference to a smart card, the invention can be used with other resource-constrained devices including, but not limited to, cellular telephones, boundary scan devices, field programmable devices, personal digital assistants (PDAs) and pagers, as well as other miniature or small footprint devices. The invention can also be used on non-resource-constrained devices.

For the purpose of this disclosure, the term "processor" may be used to refer to a physical computer or a virtual machine. Also, data processing refers to that processing required to install an application on a resource-constrained device such as a Java Card™ technology enabled device 120.

According to the present invention, physically segmented data is treated conceptually as a contiguous data stream. Data is processed within a conceptual sliding window, also called a moving set. If there are no data splits, data processing occurs as usual. If a data split is detected, the window is moved towards the source of the conceptual data stream to see the rest of the data, including the other part of the split data. This process continues until all the data is consumed.

Figure 2:
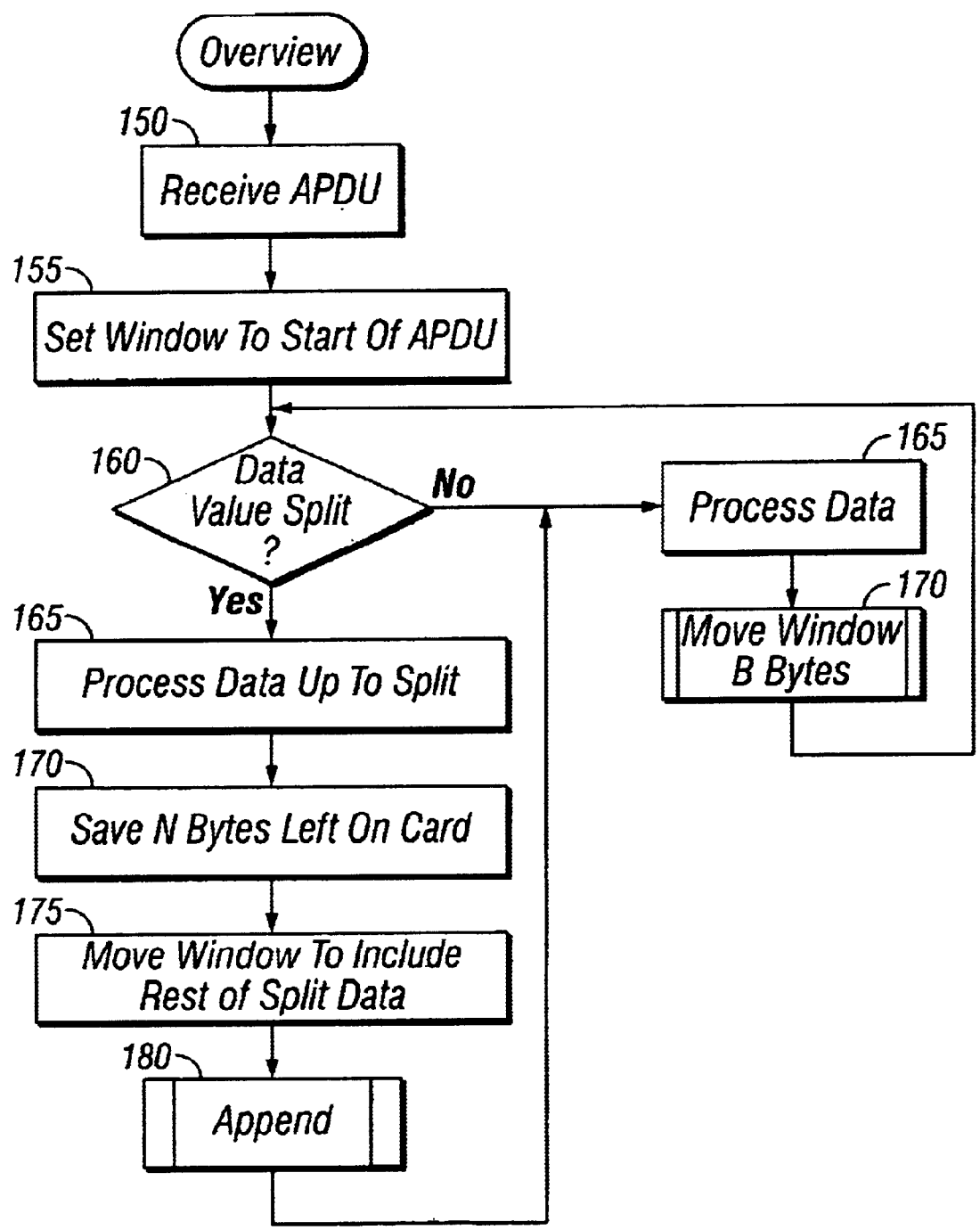
FIG. 2 is a flow diagram that illustrates a method for data communications in accordance with one embodiment of the present invention.

Turning now to FIG. 2, a flow diagram that illustrates moving data set communications in accordance with one embodiment of the present invention is presented. At reference numeral 150, a data packet is received. At reference numeral 155, the start of the window is set to the start of the data packet. At reference numeral 160, a determination is made regarding whether a data value is split. If a data value has not been split, the data is processed as usual at reference numeral 165. At reference numeral 170, the window is moved a number of bytes equivalent to the window size.

If a data value has been split, the data up to the split data value is processed as usual at reference numeral 165. At reference numeral 170, the portion of the split data value that is present is saved. At reference numeral 175, the window is moved to include the rest of the split data. At reference numeral 180, the saved portion of the split data is appended to the rest of the split data from the newly positioned window. At reference numeral 165, the appended data is processed as usual.

Figure 3:
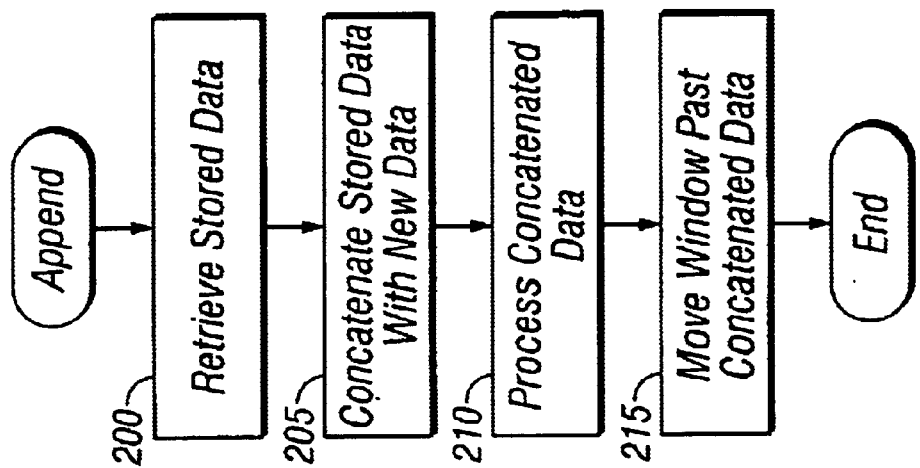
FIG. 3 is a flow diagram that illustrates a method for appending split data values in accordance with one embodiment of the present invention.
Figure 1:
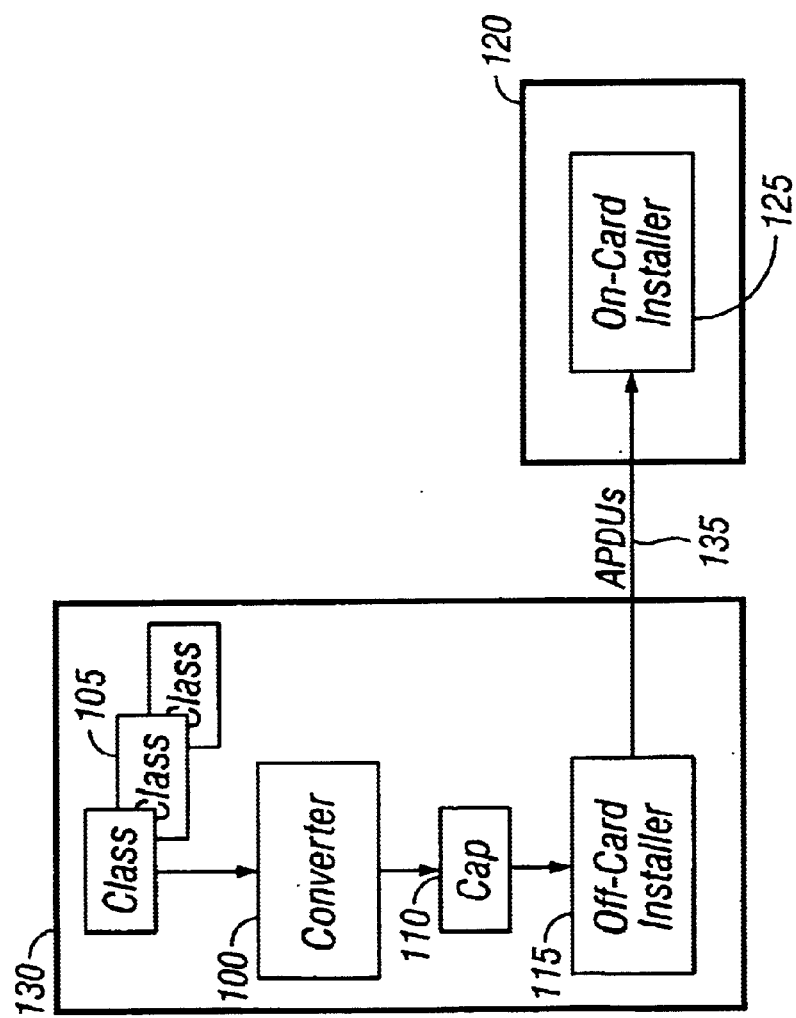
FIG. 1 is a block diagram that illustrates typical apparatus for installing applications on a Java Card™ technology enabled device.

Turning now to FIG. 3, a flow diagram that illustrates appending data in accordance with one embodiment of the present invention is presented. At reference numeral 200, the stored data is retrieved. At reference numeral 205, the stored data is concatenated with the new data obtained when the window was moved to include the rest of the split data at reference numeral 175 of FIG. 2. At reference numeral 210, the concatenated data is processed. At reference numeral 215, the window is moved past the concatenated data.

Figure 4:
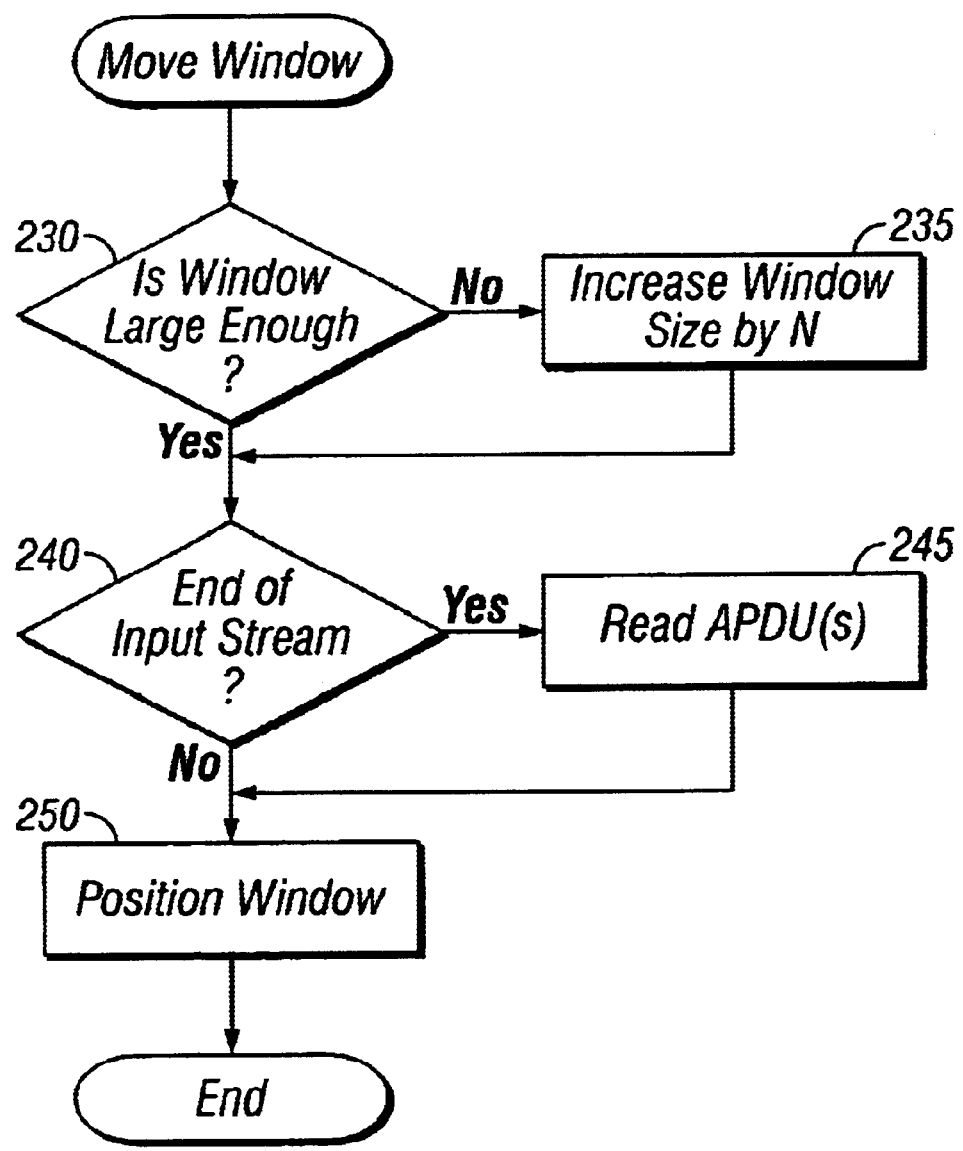
FIG. 4 is a flow diagram that illustrates a method for moving a window in accordance with one embodiment of the present invention.

Turning now to FIG. 4, a flow diagram that illustrates moving a window in accordance with one embodiment of the present invention is presented. At reference numeral 230, a determination is made regarding whether the window is large enough to accommodate the move without discarding unprocessed data. If the window is not large enough, the window size is increased at reference numeral 235. If the window is large enough, a determination is made regarding whether the end of the input stream has been reached at reference numeral 240. If the end of the input stream has been reached, at least one data packet is read at reference numeral 245. If the end of the input stream has not been reached, the window is positioned at reference numeral 250.

Figure 5:
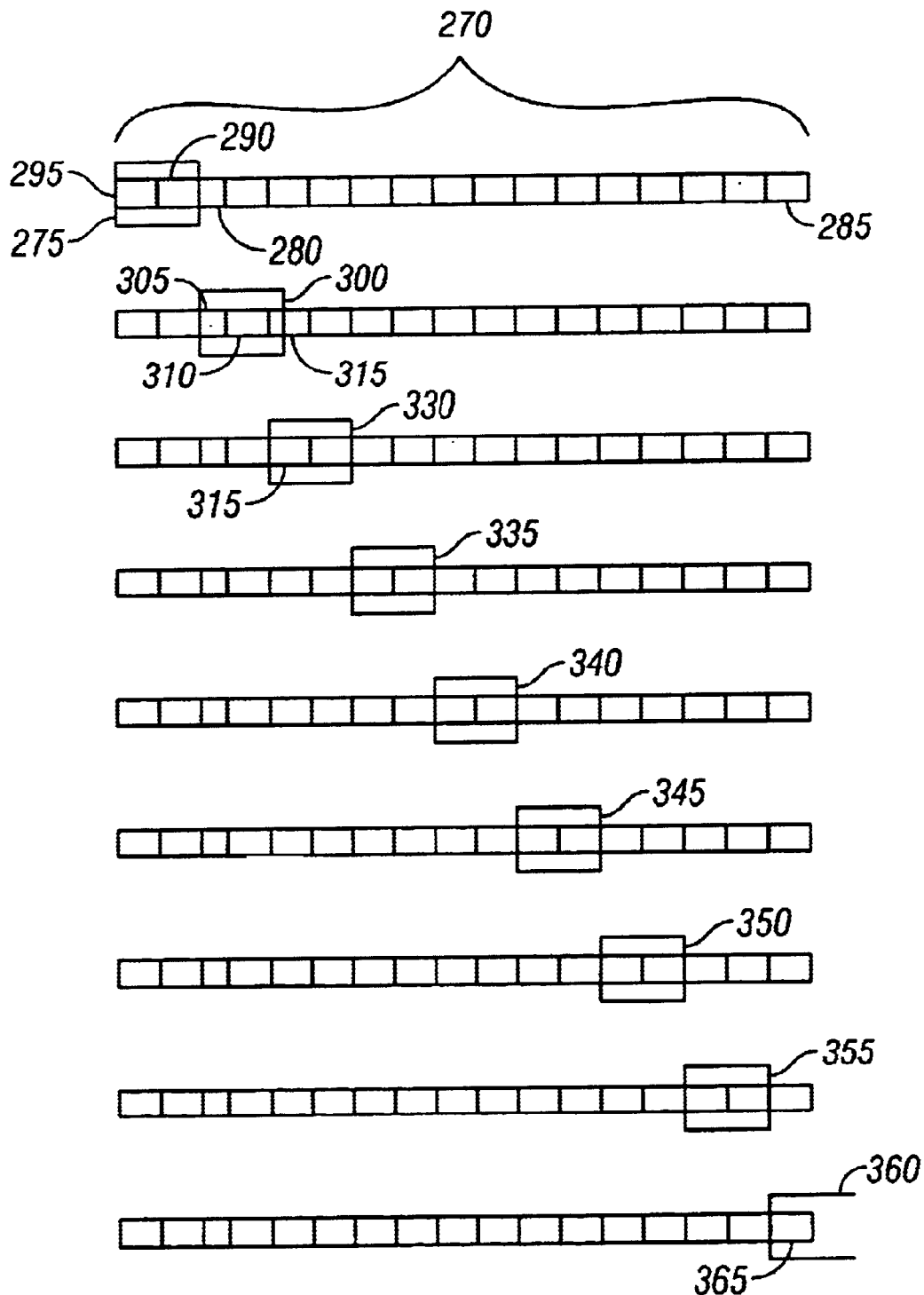
FIG. 5 is a block diagram that illustrates applying the invention to a 32-byte data packet and a four-byte window.

To aid in an understanding of the present invention, the invention will be applied to a specific example illustrated in FIG. 5. FIG. 5 illustrates the invention using a 32-byte data packet buffer 270 and a four-byte window 275. All except two data items in the data packet are two-byte integers. A byte is represented by reference numeral 280 and the first two bytes of a four-byte integer are represented by reference numeral 285. At reference numeral 150 of FIG. 2, the first data packet is received. At reference numeral 155, the window 275 is set to the start of the data packet 270. At reference numeral 160, a determination is made regarding whether a data value in the window 275 is split. Since the end if the window 275 coincides with the end of a two-byte integer 290, there is no data split. At reference numeral 165, data values 290 and 295 are processed as usual.

At reference numeral 170, the window 275 is moved. At reference numeral 230 of FIG. 4, the window is determined to be large enough to move four bytes because the window can hold that number of bytes. At reference numeral 240, a check is made to determine whether the end of the input stream has been reached. Since only four bytes of the 32-byte data packet have been processed thus far, the end of the data stream has not been reached. At reference numeral 250, the window is moved four bytes towards the source of the input stream. The repositioned window is indicated by reference numeral 300. Window 300 includes one byte 305, one two-byte integer 310 and one byte of another two-byte integer 315.

At reference numeral 160 of FIG. 2, a determination is made regarding whether a data value has been split. Since the window includes only one byte of a two-byte integer 315, a data value has been split. At reference numeral 165, the data values occurring before the split are processed. Thus, byte 305 and two-byte integer 310 are processed. At reference numeral 170, the one byte of two-byte integer 315 is saved. At reference numeral 175, the window is moved to include the rest of the split data. The repositioned window is represented by reference numeral 330. Window 330 contains both bytes of the split two-byte integer 315.

Windows 335 through 355 each contain two two-byte integers and are processed in the same manner as window 275. Window 360 includes only one half of a four-byte integer 365. The two bytes 365 are stored at reference numeral 170 of FIG. 2. At reference numeral 175, the window is moved to include the rest of the data. Since the end of the input stream has been reached, another data packet is read at reference numeral 245 of FIG. 4. Since the window size is less than the size of the 32-byte data packet data in this example, only one data packet is read. At reference numeral 200 of FIG. 3, the stored data is retrieved. At reference numeral 205, the stored data is concatenated with the other data in the window 360 that was just read from a new data packet. At reference numeral 210, the concatenated data is processed. At reference numeral 215, the window is moved past the concatenated data.

One of ordinary skill in the art will also recognize that number of data splits encountered by using the present invention varies inversely with the window size. The effect of reducing data splits by increasing the window size must be weighed against the increased memory requirements of a larger window.

According to one embodiment of the present invention, the number of bytes allocated to store split data values is selected based upon the computer architecture of the card device. A typical 16-bit processor has a two-byte integer base type. Most 16-bit processor instructions expect 16-bit operands. Thus, most data values encountered in a data packet will be two bytes or less. If a two-byte data value is split, one byte will be within the window, and the other one byte will be outside the window. Accordingly, a one-byte buffer will be enough for most situations.

Likewise, a typical 32-bit processor has a four-byte integer base type. If a four-byte integer is split, the amount of data in the window could be from one to three of the four bytes. Thus, a three-byte buffer will suffice for most situations. More generally then, for an n-base processor, where n is the number of bits, the number of bytes allocated for a storage buffer is $(n/8)-1$.

According to another embodiment of the present invention, the header portion of a data packet is used to store split data values. For example, an APDU contains a five-byte header. An APDU contains either a command or a response. The format for a typical command APDU is shown in Table 3.

TABLE 3

| CLA | INS | P1 | P2 | $L_c$ | Data | $L_e$ |

In Table 3, CLA is the Instruction class, INS is the instruction, P1 and P2 are the instruction parameters, $L_c$ is the byte length of the data field of the instruction, Data is the to data field of the instruction and $L_e$ is the maximum number of bytes expected in the data field of the response. Each item in the header is one byte in size. Accordingly, the maximum data field size is 256 bytes. APDUs are described in detail in ISO Standard 7816-4:1995, Section 5.3.

Typically, the five APDU header bytes CLA, INS, P1, P2 and $L_c$ are examined upon receipt of the APDU to determine how to interpret the data portion of the APDU. Once the information has been extracted from the header bytes, the memory locations of the header bytes are not used during subsequent processing of the APDU data portion. According to this embodiment of the present invention, the APDU header bytes are reused as a storage location for split data values, thus avoiding the allocation of additional memory.

The illustration of the present invention using a specific window size and a specific data packet size is not intended to be limiting in any way. Those of ordinary skill in the art will recognize that the invention is applicable to various data packet formats and window sizes. Also, although the present invention has been illustrated with respect to Java Card™ technology, those of ordinary skill in the art will recognize that the invention is applicable to many other platforms. These platforms include by way of example, K virtual machine (KVM) technology. KVM technology is described in "The K Virtual Machine (KVM)—A White Paper", Jun. 8, 1999, Sun Microsystems, Inc.

The present invention may be implemented in software or firmware, as well as in programmable gate array devices, Application Specific Integrated Circuits (ASICs), and other hardware.

Thus, a novel method for moving set data communication has been described. While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for data communication, comprising:

receiving a data packet, said data packet including at least one contiguous data item;

defining a window that initially includes the beginning of said at least one contiguous data item;

determining whether said window includes part of a split data item, said split data item including a first part within said window and a second part not within said window;

processing said at least one contiguous data item when said split data item is absent;

processing all of said at least one contiguous data items occurring before said first part;

storing said first part;

moving said window to include said first part and said second part;

appending said stored first part to said second part to create an appended packet; and processing said appended packet.

2. The method of claim 1 wherein said moving said window further comprises:

increasing the size of said window when said window is smaller than the combined size of said first part and said second part;

receiving another data packet when the end of an input stream is reached; and moving said window to include said first part and said second part.

3. The method of claim 1 wherein said appending further comprises:

retrieving said stored first part;

concatenating said stored first part with said second part to create concatenated data;

processing said concatenated data; and moving said the start of said window to the first byte after said second part.

4. The method of claim 1 wherein said data packet comprises an APDU, said APDU including a header; and said stored first part is stored in said header.

5. A program storage device readable by a machine, embodying a program of instructions executable by the machine to perform data communication, comprising:

receiving a data packet, said data packet including at least one contiguous data item;

defining a window that initially includes the beginning of said at least one contiguous data item;

determining whether said window includes part of a split data item, said split data item including a first part within said window and a second part not within said window;

processing said at least one contiguous data item when said split data item is absent;

processing all of said at least one contiguous data items occurring before said first part;

storing said first part;

moving said window to include said first part and said second part;

appending said stored first part to said second part to create an appended packet; and processing said appended packet.

6. The program storage device of claim 5 wherein said moving said window further comprises:

increasing the size of said window when said window is smaller than the combined size of said first part and said second part;

receiving another data packet when the end of an input stream is reached; and moving said window to include said first part and said second part.

7. The program storage device of claim 5 wherein said appending further comprises:

retrieving said stored first part;

concatenating said stored first part with said second part to create concatenated data;

processing said concatenated data; and moving said the start of said window to the first byte after said second part.

8. The program storage device of claim 5 wherein said data packet comprises an APDU, said APDU including a header; and said stored first part is stored in said header.

9. An apparatus for data communication, comprising:

at least one memory having program instructions; and at least one processor configured to use the program instructions to:
  receive a data packet, said data packet including at least one contiguous data item;
  define a window that initially includes the beginning of said at least one contiguous data item;
  determine whether said window includes part of a split data item, said split data item including a first part within said window and a second part not within said window;
  process said at least one contiguous data item when said split data item is absent;
  process all of said at least one contiguous data items occurring before said first part;
  store said first part;
  move said window to include said first part and said second part;
  append said stored first part to said second part to create an appended packet; and
  process said appended packet.

10. The apparatus of claim 9 wherein memory allocation for said stored first part is based upon the computer architecture of said at least one processor.

11. The apparatus of claim 9 wherein said at least one processor comprises an n-bit processor; and the number of 8-bit bytes allocated for said stored first part is (n/8)−1.

12. The apparatus of claim 9 wherein said at least one processor comprises a 32-bit processor; and three 8-bit bytes are allocated for said stored first part.

13. The apparatus of claim 9 wherein said at least one processor comprises a 16-bit processor; and one 8-bit byte is allocated for said stored first part.

14. The apparatus of claim 9 wherein said data packet comprises an APDU, said APDU including a header; and said stored first part is stored in said header.

15. An apparatus for data communication, comprising:

means for receiving a data packet, said data packet including at least one contiguous data item;

means for defining a window that initially includes the beginning of said at least one contiguous data item;

means for determining whether said window includes part of a split data item, said split data item including a first part within said window and a second part not within said window;

means for processing said at least one contiguous data item when said split data item is absent;

means for processing all of said at least one contiguous data items occurring before said first part;

means for storing said first part;

means for moving said window to include said first part and said second part;

means for appending said stored first part to said second part to create an appended packet; and means for processing said appended packet.

16. A resource-constrained device, comprising:

memory for storing an application software program comprising a sequence of instructions to:
  receive a data packet, said data packet including at least one contiguous data item;
  define a window that initially includes the beginning of said at least one contiguous data item;
  determine whether said window includes part of a split data item, said split data item including a first part within said window and a second part not within said window;
  process said at least one contiguous data item when said split data item is absent;
  process all of said at least one contiguous data items occurring before said first part;
  store said first part;
  move said window to include said first part and said second part;
  append said stored first part to said second part to create an appended packet; and
  process said appended packet; and a virtual machine implemented on a microprocessor that is based on an architecture of less than 32 bits, wherein the virtual machine is capable of executing instructions included within said data packets.

17. A smart card, comprising:

memory for storing an application software program comprising a sequence of instructions to:
  receive a data packet, said data packet including at least one contiguous data item;
  define a window that initially includes the beginning of said at least one contiguous data item;
  determine whether said window includes part of a split data item, said split data item including a first part within said window and a second part not within said window;
  process said at least one contiguous data item when said split data item is absent;
  process all of said at least one contiguous data items occurring before said first part;
  store said first part;
  move said window to include said first part and said second part;
  append said stored first part to said second part to create an appended packet; and
  process said appended packet; and a virtual machine implemented on a microprocessor that is based on an architecture of less than 32 bits, wherein the virtual machine is capable of executing instructions included within said data packets.

18. The smart card of claim 17 wherein said virtual machine is substantially a Java Card™ Virtual Machine.

* * * * *